Patented May 29, 1923.

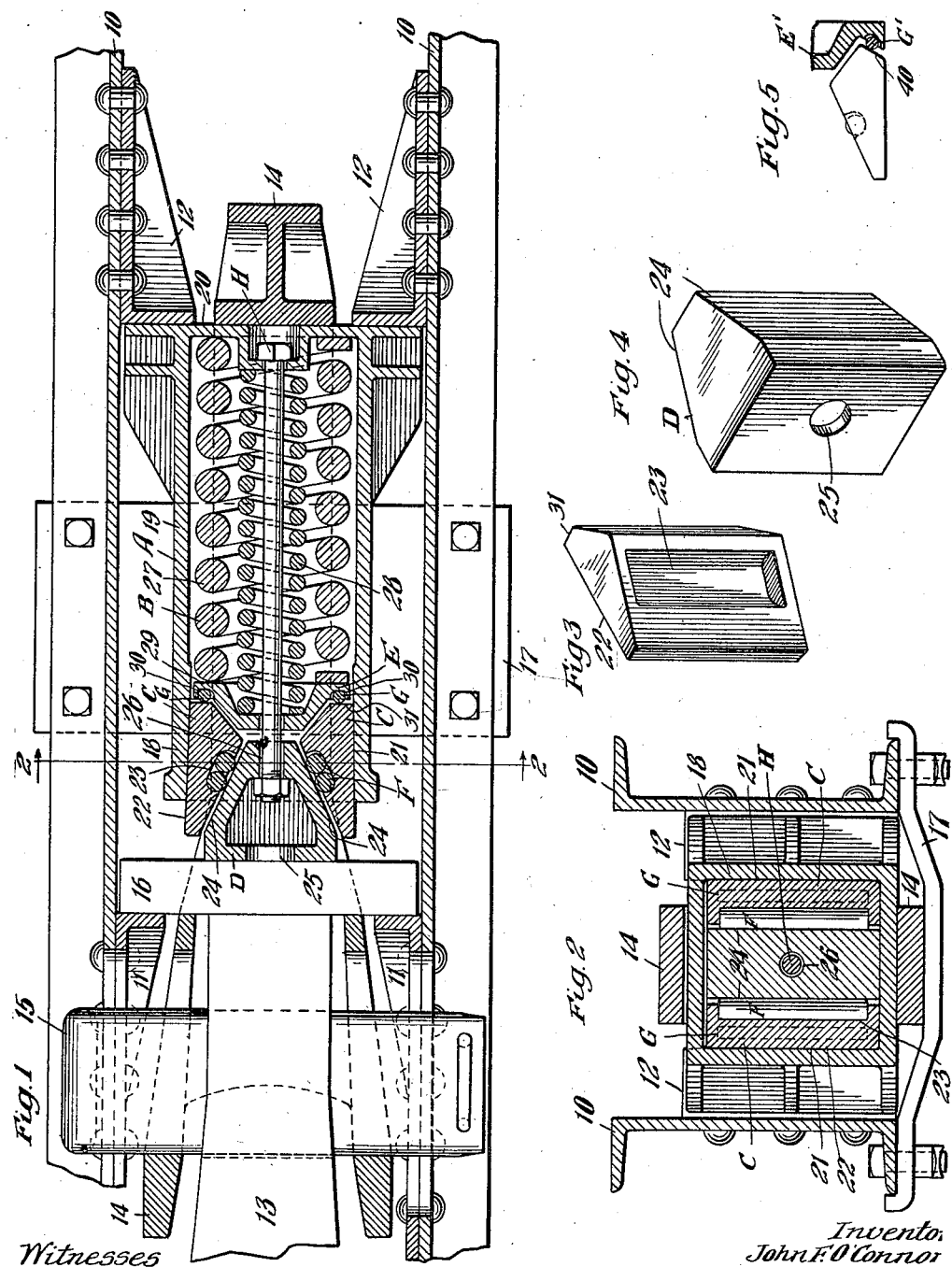

1,456,994

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed July 12, 1920. Serial No. 395,455.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide improved means for facilitating the release of the movable friction elements of a friction shock absorbing mechanism, especially a friction shock absorbing mechanism employed for use in railway draft riggings.

In the drawings forming a part of this specification, Figure 1 is a horizontal longitudinal sectional view of a portion of a railway draft rigging showing my improvements in connection therewith. Figure 2 is a vertical transverse sectional view taken substantially on the line 2—2 of Figure 1. Figures 3 and 4 are detail perspectives of one of the friction shoes and the wedge, respectively. Figure 5 is a detailed view illustrating a friction shoe, a portion of a spring follower and an anti-friction element therebetween, corresponding substantially to Figure 1 but wherein a slightly different arrangement is employed.

In said drawings, 10—10 denote channel-shaped center or draft sills of a railway car, to the inner faces of which are secured front stop lugs 11—11 and rear stop lugs 12—12. A portion of a draw bar is indicated at 13, to which is connected a hooded cast yoke 14 by means of a coupler key 15. Within the yoke is disposed a friction shock absorbing mechanism proper, hereinafter described, and a front follower 16. The yoke and associated movable parts are adapted to be supported in position by a detachable saddle plate 17.

The improved friction shock absorbing mechanism, as shown, comprises, broadly, a combined friction shell and spring cage casting A; a main spring resistance B; a pair of friction shoes C—C; a wedge D; a spring follower E; anti-friction rollers F—F interposed between the wedge and shoes; anti-friction elements G—G interposed between the follower E and shoes C; and a retainer bolt H.

The casting A is formed with the friction shell proper 18 at the forward end thereof and rearwardly with the spring cage proper 19, the rear end of the cage being closed so as to provide a rear follower 20 co-operable with the stops 12. The shell 18 is shown of substantially hollow square box-like form and is provided on its inner face with an opposed pair of longitudinally extending friction surfaces 21—21, which may be slightly inwardly converging.

The friction shoes C are of like construction and each is formed on its outer side with a friction surface 22 co-operable with a co-operating friction surface 21. On its inner side, each shoe C is provided with a relatively elongated roll seat 23, in which are accommodated preferably a pair of anti-friction rollers F—F, the depth of the roll seat being such as to leave the rollers extending outwardly beyond the surface of the shoe a slight distance so as to engage the wedge D.

The wedge D is formed with a pair of wedging surfaces 24—24, the same being flat so as to minimize the cost of manufacture. The wedge D is preferably hollow to save metal and has openings 25 and 26 therein to permit the insertion of the retainer bolt H.

The spring B is of common form and comprises an outer heavy coil 27 and a relatively lighter inner nested coil 28.

The follower E is of substantially cup shape and has an annular flange 29 against which the outer heavy coil bears, the inner lighter coil bearing against the inside bottom of the cup portion of the follower. On the outer or forward side of the flange 29 are provided a plurality of recesses or seats 30—30 to accommodate the anti-friction elements G, and in such a manner as to permit the anti-friction elements G to roll a limited distance radially inwardly and outwardly. The anti-friction elements G, as will be apparent from an inspection of Figure 1, bear on the rear flat ends 31 of the shoes C.

The retainer bolt H extends through the rear wall of the casting A, through the spring, through a suitable opening in the follower E and through the wedge. The function of the bolt H is twofold; to hold the parts in assembled relation and also to maintain the spring under an initial compression when desired.

Heretofore, it has been customary to have the inner ends of the friction shoes bear directly on the surfaces of a follower interposed between the shoes and the spring, the follower being practically necessary in order to obtain a uniform resistance from the spring to the movement of the friction shoes. With such prior constructions, it is evident that considerable friction will occur between the bearing surfaces of such follower and the inner ends of the shoes at the end of the compressive stroke, the amount of friction depending upon the degree of compression of the spring. Consequently, in initiating the release, said resistance interferes with the inwardly radial movement of the shoes away from the surfaces of the shell. By introducing anti-friction elements between the follower and the shoes, this resistance is reduced to a minimum, and, consequently, the shoes are substantially free to disengage themselves at their inner ends from the shell, or, at least move inwardly toward each other as the friction shell contracts after the actuating pressure is removed. The anti-friction elements G are especially advantageous where the friction shell is slightly tapered, since in actual practice it is found that, with a slightly tapered friction shell, the latter will expand slightly during the compressive action into a cylinder of substantially non-tapered form and during the release will contract to its normal form. It will be understood by those skilled in the art that the anti-friction elements G may be in the form of either rollers or balls.

In the construction illustrated in Figure 5, the inner ends of the friction shoes are inclined inwardly and rearwardly, as indicated at 40, so that the pressure transmitted from the spring through the follower E′ and anti-friction elements G′ will be exerted against the inner ends of the shoes in outwardly converging lines. Obviously, this method of transmitting the forces from the spring to the inner ends of the shoes will increase the releasing effect, since there is a definite tendency to pull the inner ends of the shoes away from the shell.

Although I have herein shown and described what I now consider the preferred manner of carrying out the invention, the same is merely illustrative and I contemplate all changes and modications that come within the scope of the claims appended hereto.

I claim:

1. In a friction shock absorbing mechanism, the combination with the member having longitudinally extending friction surfaces; of friction shoes slidable on and cooperable with said friction surfaces, said shoes having inwardly converging faces at their inner ends; wedge acting means for pressing said shoes into frictional contact with said member; a spring resistance; a follower interposed between said spring resistance and the shoes, said follower, on its side adjacent the shoes having bearing seats; and roller anti-friction means interposed between said follower bearing seats and the converging inner faces of said shoes.

2. In a friction shock absorbing mechanism, the combination with a friction shell; of friction shoes co-operable therewith, the shoes having inwardly converging faces at their inner ends; a wedge; anti-friction elements interposed between the wedge and the shoes; a spring resistance; a follower at the end of the spring adjacent the shoes; and anti-friction rolling elements interposed between said follower and said inner end faces of the shoes.

3. In a friction shock absorbing mechanism, the combination with a friction shell having interior friction surfaces; of a central wedge member provided with inwardly converging flat continuous wedge faces; friction shoes co-operable with said shell and said central wedge member, said shoes having inwardly converging faces, said faces being provided with antifriction roller retaining seats, having stop shoulders at opposite ends, said shoes also having their inner ends provided with flat bearing faces; anti-friction rollers housed within said seats and co-acting with said continuous flat wedge faces; a spring resistance; a follower interposed between said spring resistance and the inner ends of said shoes, said follower having a plurality of antifriction roller receiving seats on the side thereof adjacent the inner ends of said shoes, each of said seats having stop shoulders at opposite ends; and a plurality of anti-friction rollers housed in said seats and co-acting with said end flat bearing faces of said shoes.

In witness that I claim the foregoing I have hereunto subscribed my name this 18th day of June, 1920.

JOHN F. O'CONNOR.

Witnesses:
CARRIE GAILING,
UNA C. GRIGSBY.